United States Patent [19]

Browers et al.

[11] 4,183,984
[45] Jan. 15, 1980

[54] OIL SORBENT MATERIAL MADE BY OPENING CELLS OF A CLOSED CELL FOAM

[75] Inventors: Scott D. Browers, Cloquet; Donald E. Wiegand, Minneapolis, both of Minn.

[73] Assignee: Conwed Corporation, St. Paul, Minn.

[21] Appl. No.: 846,035

[22] Filed: Oct. 27, 1977

[51] Int. Cl.$^2$ .......... B01D 39/16; B01J 1/22; C02B 9/02; C08J 9/36
[52] U.S. Cl. .......... 428/81; 210/DIG. 26; 210/242 AS; 252/425.5; 252/426; 428/131; 521/905
[58] Field of Search .......... 260/2.5 HA; 210/DIG. 26, 510, 446, 242 AS; 264/103, 243; 252/425.5, 426, 430; 428/81, 131

[56] References Cited

U.S. PATENT DOCUMENTS

| | | |
|---|---|---|
| 3,048,537 | 8/1962 | Pall et al. .......... 210/510 |
| 3,098,832 | 7/1963 | Pooley et al. .......... 260/2.5 HA |
| 3,426,902 | 2/1969 | Kilpert et al. .......... 210/DIG. 26 |
| 3,669,275 | 6/1972 | Downs .......... 210/DIG. 26 |
| 3,679,540 | 7/1972 | Zimmerman .......... 260/2.5 HA |
| 3,862,963 | 1/1975 | Hoshi et al. .......... 210/DIG. 26 |
| 3,960,722 | 6/1976 | Tomikawa et al. .......... 260/2.5 HA X |
| 3,994,759 | 11/1976 | Stoller .......... 264/103 X |
| 4,005,169 | 1/1977 | Cumbers .......... 264/293 X |

Primary Examiner—Frank A. Spear, Jr.
Attorney, Agent, or Firm—Eyre, Mann, Lucas & Just

[57] ABSTRACT

Closed cells in a flexible foam structure and preferably a polyethylene foam sheet are opened, suitably by needle punching, to increase the oil sorbency of the pad. One embodiment uses needle punching which does not pass all the way through the sheet, thus blocking passage of oil therethrough. Another embodiment employs unpunched strips for prevention of migration of the oil or for buoyancy purposes.

15 Claims, 6 Drawing Figures

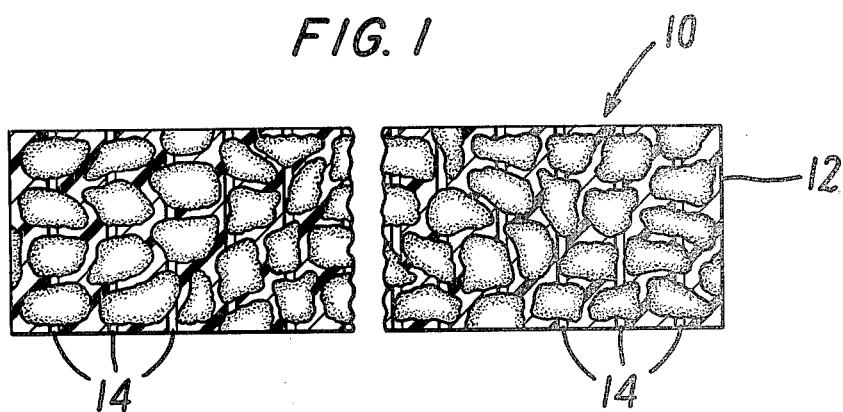
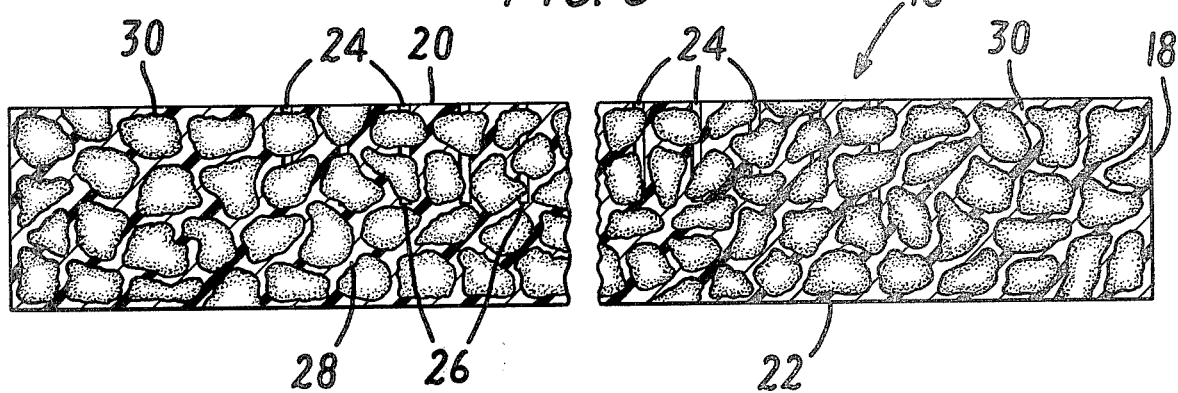
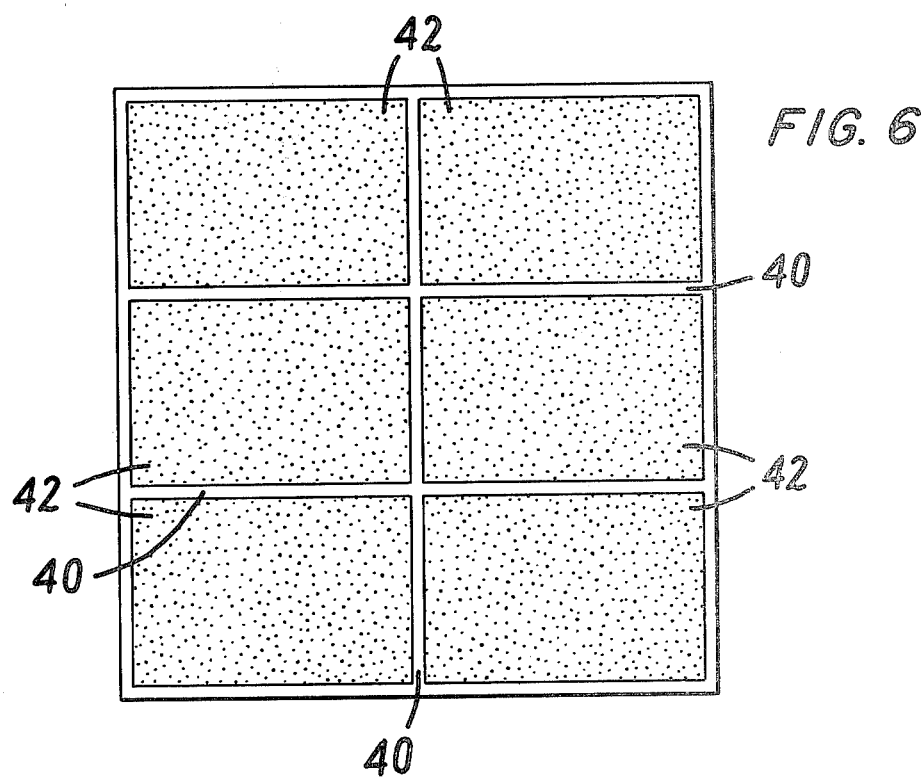

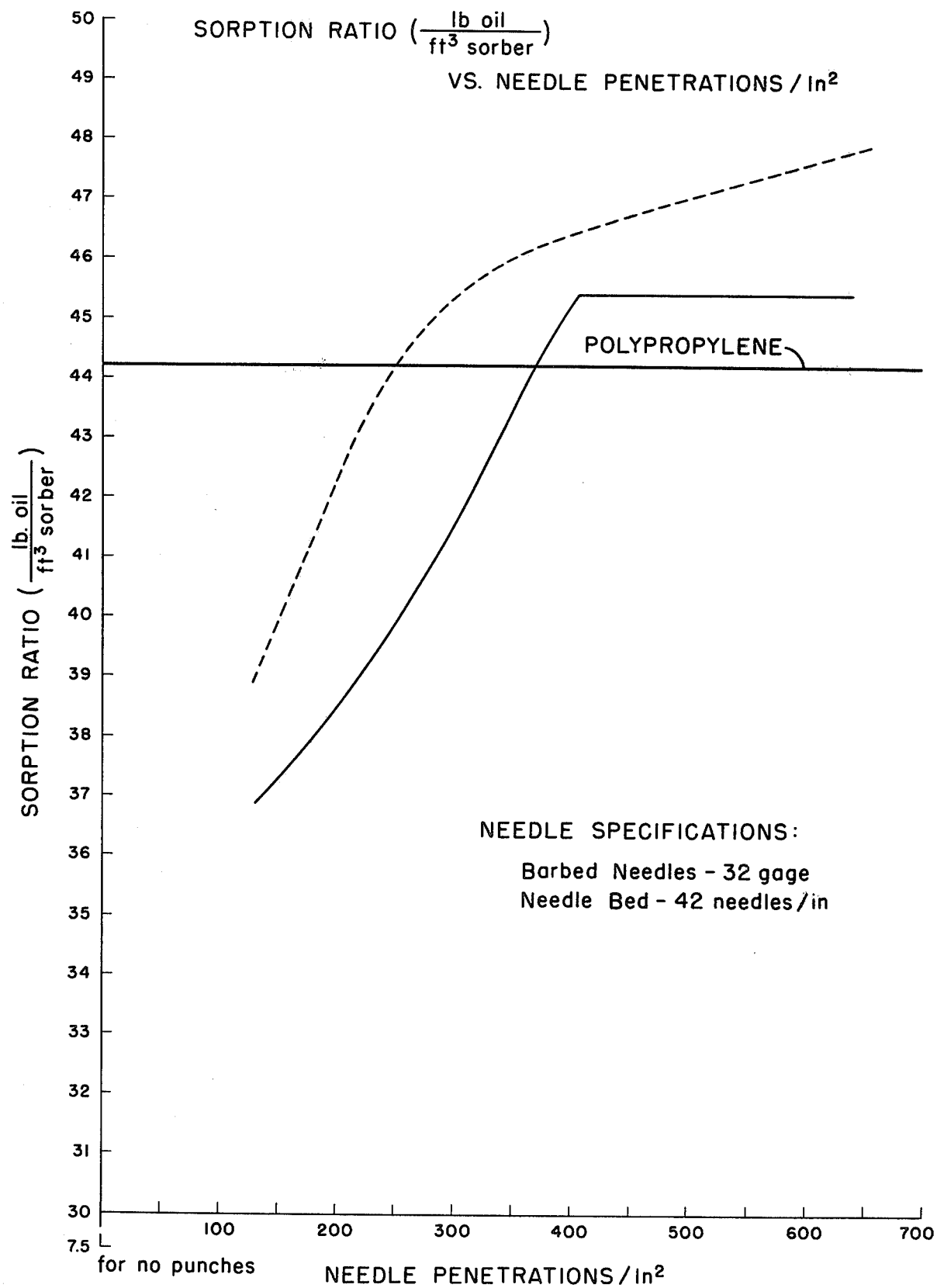

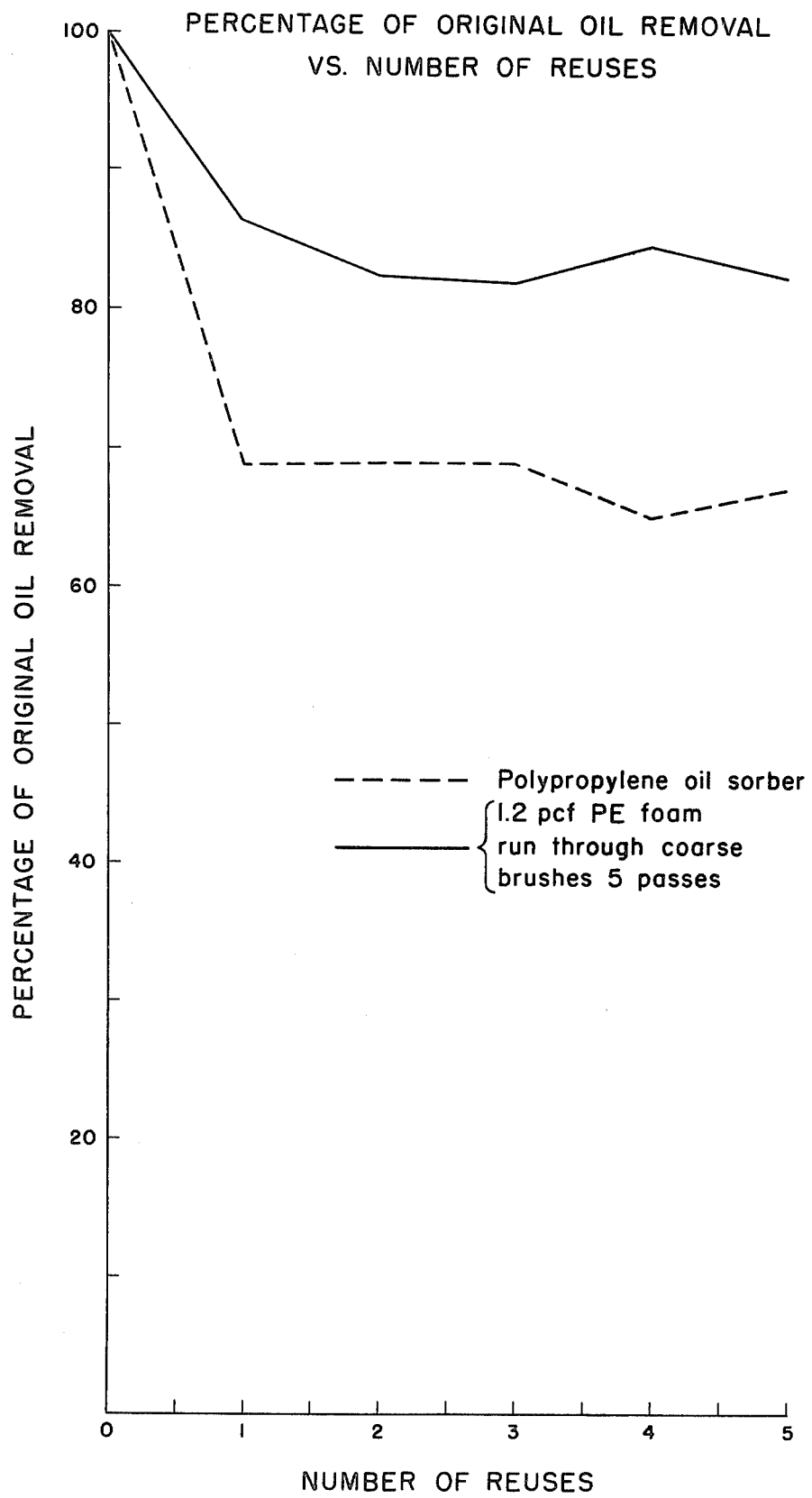

OIL SORBENT MATERIAL MADE BY OPENING CELLS OF A CLOSED CELL FOAM

BACKGROUND OF THE INVENTION

Materials for sorbing oil are in demand for cleaning up environmental oil pollution, such as oil spills on water, oil drippings on roadways, driveways or garage floors, liquid grease on food products and numerous other uses. The term oil is taken herein to mean any liquid hydrocarbon including those derived from petroleum, mineral, animal and plant sources.

Oil sorbers which have been commercially used of late include polyurethane foam, fibrous polypropylene or cellulosic material.

The polyurethane foam is an open or predominantly open cell material which suffers a number of drawbacks. One of those is that polyurethane foam will sorb water as well as oil and it is therefor necessary to prime the foam with oil so that it will preferentially sorb oil over water. This is especially important when the oil sorption is to take place at a water-oil interface since the polyurethane foam is capable of sorbing sufficient water to sink. Furthermore, polyurethane foam is relatively fragile with continued use in applications where it is desired to remove the oil by wringing and reusing the material a number of times.

Cellulosic fiber as an oil sorber is either in bulk form such as straw or in mat form made from fibers. Cellulosic fiber in its natural state (e.g. straw) is not usually considered satisfactory for an oil-water interface because the cellulosic fiber preferentially sorbs water to the substantial exclusion of oil. Cellulosic fiber may be sized to make it hydrophobic in which case its oleophilic properties remain (see for example U.S. Pat. No. 3,630,891). Even when thus formed, however, the cellulosic sorber is structurally weak and is generally unsuitable for repeated use with wringing or other mechanical oil removal between uses.

Fibrous polypropylene sorbers, (see for example U.S. Pat. No. 3,764,527) overcome much of the difficulty of polyurethane foams and cellulosic fibers in terms of preferential sorption and strength. However, they have their own drawbacks, a chief one of which is a very limited reuse potential when the oil is mechanically removed. Another problem is durability in turbulent water. While certainly better than the turbulent water durability of cellulosic materials, they still leave a great deal to be desired where used in turbulent water.

SUMMARY OF THE INVENTION

In accordance with the present invention the disadvantages of known oil sorbing materials are overcome with a flexible foam sheet which is formed as a closed cell foam and is then treated to open it, preferably with a needle punching apparatus.

The sorbent of the present invention is a flexible closed cell foam product which has at least about 50 percent by weight void space and preferably at least about 90 percent by weight void space. The product will usually be and is preferably a sheet but other forms such as blocks, spheres and the like can be used where desired. The expression of the void space in terms of weight is, of course, somewhat anomalous but is done because of the method used for determining void space. This is accomplished by dividing the weight of a specific volume of foam by the weight the same volume of material would have if it were not foamed. For example, presume that a polyethylene resin having a weight of 57 pounds per cubic foot is made into a foam weighing 3 pounds per cubic foot. According to the present invention, the foam has a void space of about 95 percent by weight, i.e. approximately 95 percent of the weight of the resin has been replaced by void space.

The most preferred resin for use in the present invention is polyethylene. However, very good results have also been obtained with foamed polypropylene resin and foamed Surlyn resin (a DuPont trademark for a polyethylene copolymer comprising a block copolymer of polyethylene of methacrylic acid cross linked by ionic bonds through metal groups which neutralize at least some of the acid groups). A subset of preferred resins is polyolefins and polyolefin copolymers (e.g. Surlyn, EPM, etc.). However, any flexible foam can be used which has the minimum void space as set forth hereinbefore and is preferentially sorptive of oil over water. Among such other compounds are the vinyl compounds, e.g. plasticized PVC.

The preferred embodiment of the present invention teaches the use of a closed cell polyethylene sheet material of from about 1 to about 5 pounds per cubic foot (pcf) and having about 100 to about 700 cells per cross-sectional square inch in which needle punching at a punch density of between 50 and 1000 penetrations per square inch is used to open up a significant and preferably predominate portion of the closed cells to enable oil sorption therein. The needle punching may open less than 100 percent of the cells in the polyethylene foam in which case the remaining closed cells provide buoyancy when used in a water/thick oil layer interface application so that the sheet will remain on top of the oil.

The product of the present invention has superior properties as compared to other commercially available oil absorbers.

In one embodiment of the invention, the needle punches are introduced to a sheet in a pattern which leaves regions having unperforated cells or an unperforated surface between totally perforated regions. The closed-cell unperforated regions then block the leakage of oil therethrough. For example, a polyethylene pad may be needle punched from one side with the needles penetrating only part way through the material. The side of the sheet which is perforated is then a good oil sorber while the unperforated side of the sheet is substantially oil impermeable. Use of such material is foreseen on a garage floor under an automobile which may drip oil and where it is desired to sorb the oil but prevent penetration of the oil through to the underlying floor surface. In other applications additional barriers may be left unperforated in a foam sheet to prevent lateral migration of the sorbed oil. This will also have the benefit of increasing buoyancy of the product in water.

BRIEF DESCRIPTION OF THE DRAWINGS

FIG. 1 shows a cross-sectional drawing of one embodiment of the invention.

FIG. 2 shows sorption ratio versus needle penetrations per square inch for a polyethylene foam sheet as compared to a polypropylene fiber oil sorber.

FIG. 4 shows the percent of original oil removal versus number of reuses for a polyethylene foam sheet as compared to a polypropylene fiber oil sorber.

FIG. 5 shows a second embodiment of the invention.

FIG. 6 shows a third embodiment of the invention.

DETAILED DESCRIPTION OF THE PREFERRED EMBODIMENT

Figure 3:
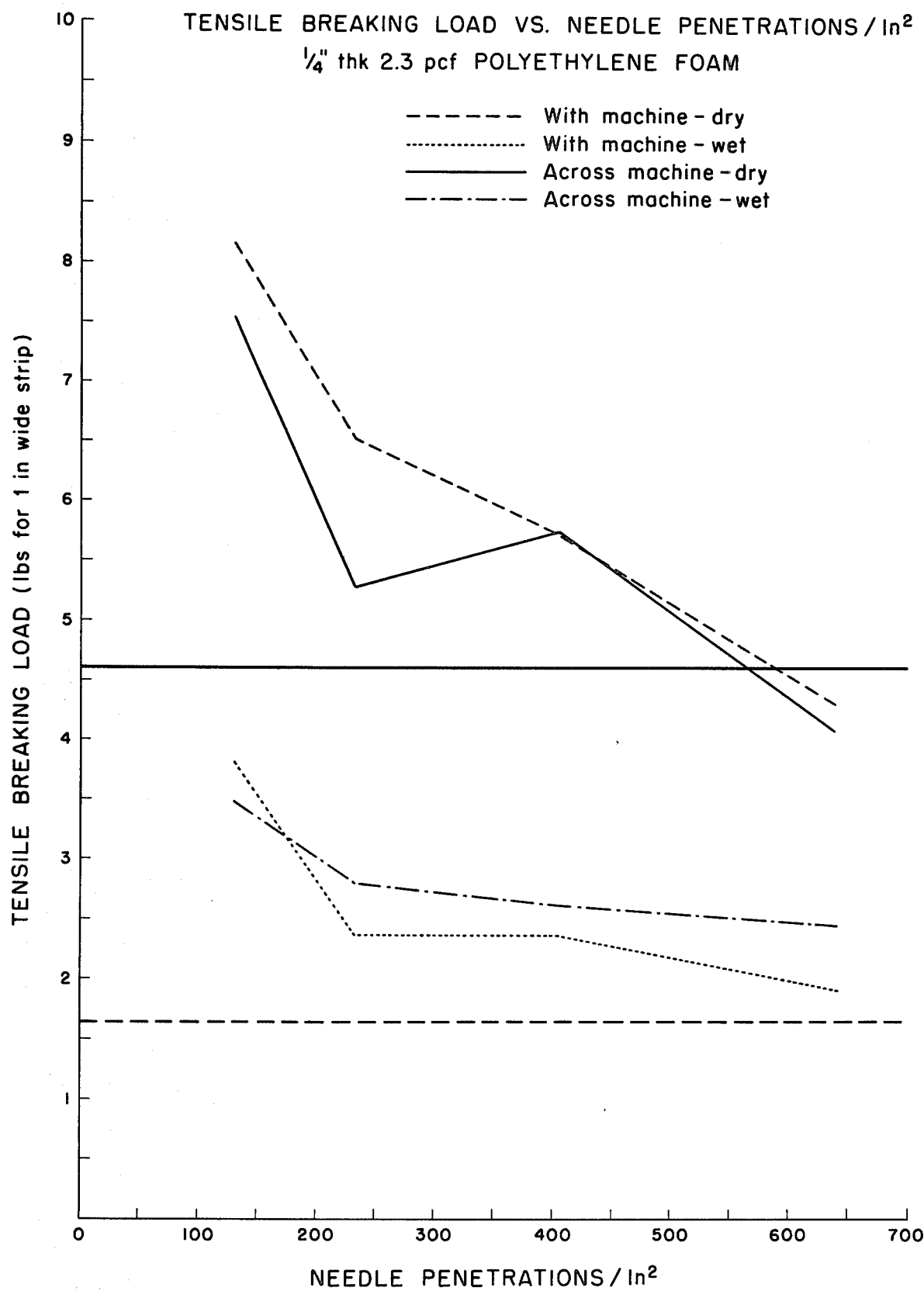
FIG. 3 shows tensile breaking load versus needle penetrations per square inch for 2.3 pcf polyethylene foam as compared to a polypropylene fiber oil sorber.

FIG. 1 shows generally at 10 a cross-sectional view of a flexible foam sheet 12 having a plurality of needle punches 14 completely through the material. FIG. 2 compares the oil sorption ratio in pounds of oil per cubic foot of polyethylene foam versus the number of needle penetrations per square inch for two foam densities, namely 1.2 pcf and 2.3 pcf and compares the result with a commercially available polypropylene fiber oil sorber sold by 3M Company under the trademark 3M Brand Oil Sorbent. The oil sorption increases for both polyethylene samples from about 7.5 pounds of oil per cubic foot of sorber with no penetrations to 37 pounds of oil at 125 penetrations for 1.2 pcf foam and about 39 pounds of oil for 125 penetrations for 2.3 pcf foam. The oil sorbency increases steeply with needle punch density leveling out somewhat beyond about 400 needle punches per square inch at which point the 1.2 pcf foam absorbs about 45.5 pounds of oil and the 2.3 pcf foam absorbs more then 46 pounds of oil. In this range, both examples of needle punched polyethylene foam have superior sorption to the commercial polypropylene oil sorption which is limited to about 44.2 pounds of oil per cubic foot of sorber. For maximum oil sorption, needle punch density in the vicinity of 400 penetrations per square inch is desirable. If the needle penetration density increases however, the buoyancy of the material at saturation decreases due to a greater percentage of the cells being open to sorption. Consequently, some applications may require higher terminal buoyancy and it would then be necessary to sacrifice some of the oil sorption by employing a lower punch density such as 250 punches per square inch.

FIG. 3 compares the tensile strength of a one inch strip of 2.3 pcf polyethylene foam one quarter inch thick both wet and dry tested in the machine direction and across the machine direction versus the number of needle penetrations per square inch. Machine direction refers to the direction in which the polyethylene foam is extruded and the across machine direction refers to a direction 90° transverse to machine direction. The strength of the polyethylene foam decreases as the number of needle penetrations per square inch increases, but at a needle penetration density of lower than about 550 per square inch, the polyethylene foam is stronger than the reference polypropylene fiber sorber and this is true in both wet and dry states. The wetness in all cases is due to soaking in oil for one hour.

FIG. 4 compares the ability for retaining oil sorbency after a number of reuses between 1.2 pcf needle punched polyethylene foam and the reference polypropylene oil sorber. The polyethylene in this example was prepared by passing a sheet of foam 5 through wire rollers whose bristles intermeshed. The wires penetrated the foam similar to needle punching. The oil sorbency of the polyethylene stabilizes at about 82 percent of its original capacity whereas the polypropylene oil sorber stabilizes below 70 percent of its original capacity after its second use.

A second embodiment of the invention is shown generally at 16 in FIG. 5. A pad of closed cell polyethylene foam 18 having a first surface 20 and a second surface 22 is needle punched according to the method hereinabove. The needle punches 24 penetrate the first surface 20 terminating at a location 26 above the second surface 22 leaving a region 28 unpunched. This embodiment 16 is capable of sorbing oil which reaches its surface 20 and retaining it without substantial leakage through the material to its second surface 22. This is excellent for garage floors, areas around machine tools, oil delivery men and the like. If desired, the needle punches 24 may be limited to a central region of the first surface 20 of the closed cell polyethylene foam 18 leaving the region 28 and the peripheral region 30 at least ¼ inch wide unpunched. Thus any oil sorbed through the surface 20 is not only prevented from migrating to the second surface 22 but is also prevented from edgewise migration through the peripheral region 30 to the edges 32.

Another pattern of punching is shown in FIG. 6 in which needle punching one or more central barrier regions 40 are left unpunched around regions to prevent edgewise migration from one region of the material to another. This appears to have substantial advantage in picking the material up at the corners in that it reduces buildup of a "head" which tends to cause the oil to drain from the opposed corner of the sheet.

While the predominant discussion herein of breaking the surface of the foam sheet has been with respect to needle punching, there are a great variety of other ways in which the surface can be broken. Among these are the following:

reducing the ambient pressure by placing the foam in a vacuum whereby the cells expand to the point that they rupture;

increasing the internal pressure or temperature in the foam such as by pressing or heating whereby the cells rupture;

cutting into the cells with knife blades, suitably positioned on a rotating drum;

distributing small particles of a reactive chemical or a heated substance on the surface of the foam sheet whereby small holes are developed by corrosion, dissolution, melting, etc.;

penetration by high velocity particles such as sandblasting;

penetration by high energy sources such as sparks, laser beams, etc.

It therefore will be understood that the claims are intended to cover all changes and modifications of the preferred embodiments of the invention, herein chosen for the purpose of illustration which do not constitute departures from the spirit and scope of the invention.

What is claimed is:

1. An oil sorbent material comprising:
   (a) a flexible closed cell foam structure having at least about 50 percent by weight void space and having opposed surfaces;
   (b) said flexible closed cell foam structure having from about 100 to about 700 cells per cross sectional square inch and a density of from about 1 to about 5 pcf;
   (c) said flexible closed cell foam structure having at least a predominate portion of the closed cells opened through at least one said surface by needle punching with from about 50 to about 1000 holes per square inch of surface dimension.

2. The oil sorbent of claim 1 further comprising said holes passing completely through said flexible closed cell foam structure.

3. The oil sorbent of claim 2 further comprising at least one strip region of said sheet which is unbroken on both surfaces.

4. The oil sorbent of claim 2 further comprising a peripheral region at least one quarter inch wide which is unbroken on both surfaces.

5. The oil sorbent of claim 1 wherein said surface is broken by from about 200 to about 500 holes per square inch of surface dimension.

6. The oil sorbent of claim 1 wherein said structure is at least about 90 percent by weight void space.

7. The oil sorbent of claim 1 wherein the foam structure is composed of a resin selected from the group consisting of polyolefins and polyolefin copolymers.

8. The oil sorbent of claim 1 wherein said foam structure has from about 100 to about 700 cells per cross-sectional square inch.

9. An oil sorbent material comprising:
(a) a flexible closed cell polethylene foam sheet having at least about 50 percent by weight void space and having opposed surfaces;
(b) said flexible closed cell polyethylene foam sheet having from about 100 to about 700 cells per cross sectional square inch and a density of from about 1 to about 5 pcf;
(c) said flexible closed cell polyethylene foam sheet having at least a predominate portion of the closed cells opened through at least one said surface by needle punching with from about 50 to about 1000 holes per square inch of surface dimension.

10. The oil sorbent of claim 9 further comprising said holes passing completely through said flexible closed cell polyethylene foam sheet.

11. The oil sorbent of claim 10 further comprising at least one strip region of said sheet which is unbroken on both surfaces.

12. The oil sorbent of claim 10 further comprising a peripheral region at least one quarter inch wide which is unbroken on both surfaces.

13. The oil sorbent of claim 9 wherein said surface is broken by from about 200 to about 500 holes per square inch of surface dimension.

14. The oil sorbent of claim 9 wherein said sheet is at least about 90 percent by weight void space.

15. An oil sorbent material comprising:
(a) a flexible closed cell foam structure having at least about 50 percent by weight void space and having first and second opposed surfaces;
(b) said flexible closed cell foam structure having from about 100 to about 700 cells per cross sectional square inch and a density of from about 1 to about 5 pcf;
(c) said flexible closed cell foam structure having at least 50 to about 1000 holes per square inch of surface dimension penetrating said first surface and continuing through said second surface whereby a predominate portion of the closed cells are opened.

* * * * *